United States Patent
Pallesi

[11] 3,752,120
[45] Aug. 14, 1973

[54] CAT LITTER BOX
[75] Inventor: Sam W. Pallesi, Fresno, Calif.
[73] Assignee: Th Raymond Lee Organization, Inc., New York, N.Y. ; a part interest
[22] Filed: Nov. 22, 1971
[21] Appl. No.: 200,818

[52] U.S. Cl. .................................................. 119/1
[51] Int. Cl. ........................................... A01k 29/00
[58] Field of Search ..................................... 119/1

[56] References Cited
UNITED STATES PATENTS
2,963,003  12/1960  Oberg et al. .......................... 119/1
3,085,550  4/1963  Crawford .............................. 119/1
2,971,493  2/1961  Robb ..................................... 119/1
3,141,441  7/1964  Russell .................................. 119/1

Primary Examiner—Hugh R. Chamblee
Attorney—Howard I. Podell

[57] ABSTRACT

A litter box for use by cats, consisting of a series of three nesting containers, which may be enclosed by a removable hood shaped in the form of a house. The uppermost nesting container has a bottom of screen wire, with a pair of handholds in the side of the container. This container, when nested over the other two containers is partially filled with sand. Each of the other two containers, with solid bottoms have projecting tabs along the side for use as handholds.

2 Claims, 4 Drawing Figures

PATENTED AUG 14 1973 3,752,120

INVENTOR.
SAM PALLESI
BY Howard H. Podell
ATTORNEY

CAT LITTER BOX

SUMMARY OF THE INVENTION

The object of this invention is to provide a sanitary litter box for cats, which may be readily cleaned of refuse.

The device consists of three nesting containers, the uppermost having a screen bottom, with handholds on the side of each container. The containers may be housed in a removable hood, shaped in the form of a house, with an open door for the cat to enter or leave the device.

In use, the uppermost container is partially filled with sand, after being nested over the other two containers. At periodic intervals, the solid matter is screened by lifting this uppermost container, and permitting the sand to fall through the screen into the next lower container. After the refuse lying on the screen has been disposed of, the screen bottom container is nested into the remaining empty container, and the sand is poured into it from the storage container, which when empty, is nested under the other containers to become the bottom container.

DESCRIPTION OF THE DRAWING

The objects and features of the invention may be understood with reference to the following detailed description of an illustrative embodiment of the invention taken together with the accompanying drawing in which.

DESCRIPTION OF THE PREFERRED EMBODIMENT

Figure 1:
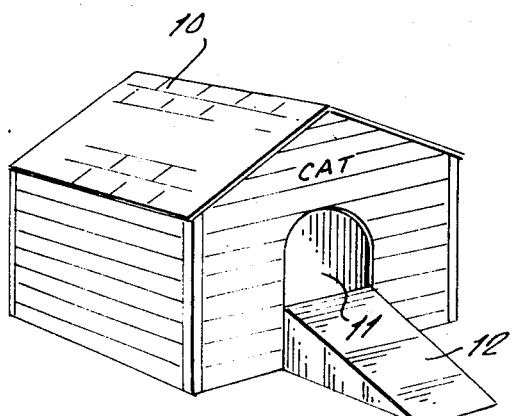
FIG. 1 is a perspective view of the device as housed.

Turning now descriptively to the drawing in which similar reference characters denote similar elements throughout the several views, FIG. 1 illustrates the device enclosed in a housing 10 having an open bottom and with an opening 11 in one or more sides of housing 10 for the cat to enter. A ramp 12 may be employed as a separate unit, or the ramp 12 may be physically attached to the external housing 10.

Figure 2:
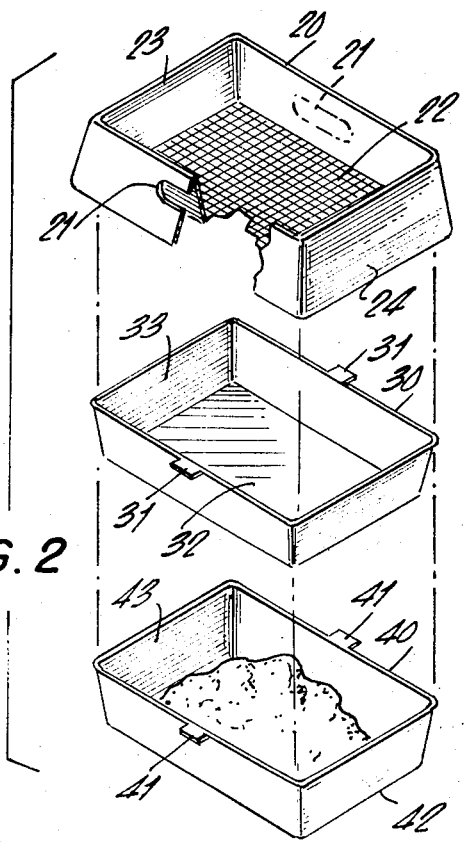
FIG. 2 is an exploded perspective view of the three nesting containers.
Figure 4:
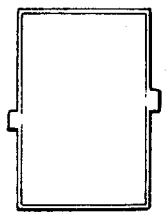
FIG. 4 is a top plan view of one of the containers.

Referring to FIG. 2, nesting container 20 has an open screen 22 for a bottom, with internally inclined sides 23 which nest into either of the other two containers 30 and 40, and with externally inclined sides 24 which enclose the containers nestedbelow it. An open handhold 21 is cut into the middle section of each longitudinal side of container 20 so that the screened container 20 may be readily lifted.

Containers 30 and 40 may be of similar construction with flat bottoms 32 and 42 respectively and with inclined sides 33 and 43 which permit each containers to nest in the other. Handgrips 31 and 41 project from the middle towards one end of each container 30 and 40 respectively, with the containers longitudinally oriented so that in use, handgrips 31 lie towards one end of the containers, while handgrips 41 lies towards the other longitudinal end of the containers, thus enabling either or both containers to be readily lifted, as desired.

Figure 3:
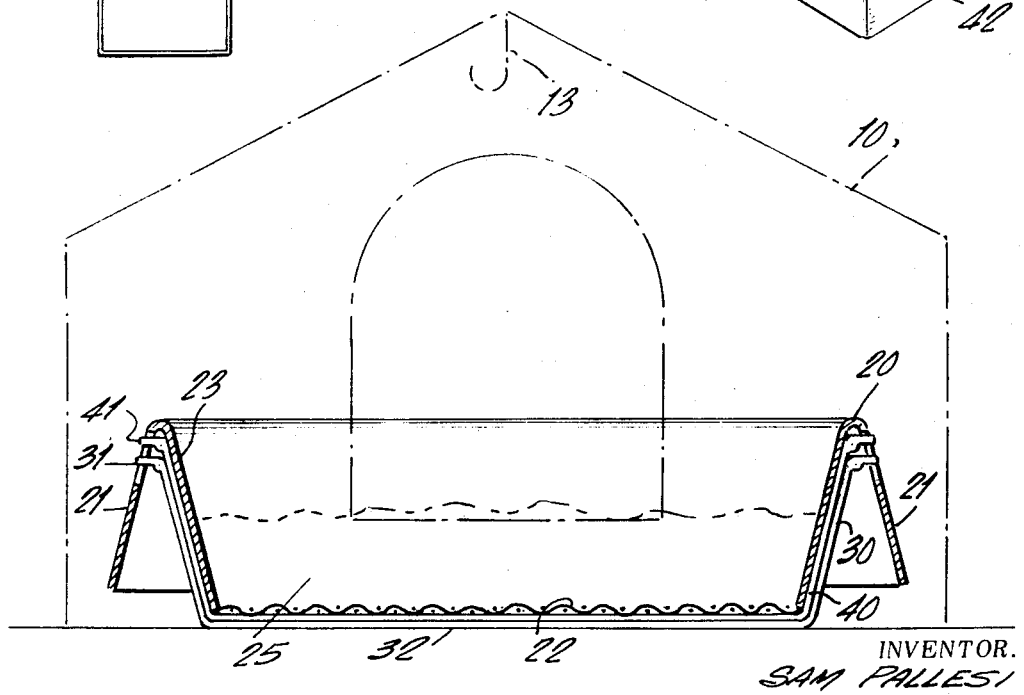
FIG. 3 is a cross-section view in elevation of the device.

In use, the screen bottomed container 20 is nested over the other two containers 40 and 30 respectively as shown in FIG. 3 and partially filled with sand 25. The containers are then covered by the housing 10, in which hook 13 is adaptable for use for the hanging of a deodorant unit. When it is desired to remove the solid refuse, the housing 10 is removed, and screen bottom container 20 is lifted, permitting the sand to fall into container 40, while retaining any solid matter on the screen 22. After cleaning of the screen 22, container 20 is nested, as shown in FIG. 2 into container 30, and the sand 25 in container 40 is poured into the screen bottomed container 20. Container 40 is then nested below container 30, and the housing 10 is replaced.

Since obvious changes may be made in the specific embodiment of the invention described herein without departing from the scope thereof, it is indicated that all matter contained herein is intended to be interpreted in an illustrative sense and not a limiting sense.

Having thus described my invention, what I claim as new, and desire to secure by Letters Patent of the United States is:

1. A sanitary litter box for use by cats comprising a series of three nesting containers, one of which has a screen bottom, with the other two containers formed with solid bottoms, together with an open bottom housing which fits over the containers, said housing having an opening in one or more sides adaptable for a cat to enter in which an external ramp is fastened to the external side of the housing below the said side opening, the height of said ramp corresponding to the height of the top nested container, in which the sides of each of the solid bottomed containers are inclined upwardly away from the center of the container, so that each of the two such containers may nest above or below the other container, with the screen bottomed container having internal inclined sides adaptable to permit the screen bottomed container to nest inside either of the solid bottomed containers, the screen bottomed container having additional externally inclined sides which project over and about the sides of the containers nested below it, said externally inclined sides joining at their upper edges the internally inclined sides of the screen bottomed container, with the internal inclined sides being joined to the bottom of the screen bottomed container and angled upwardly away from the center of the container, and the externally inclined sides angled downwardly away from the center of the container, such that the three containers may be nested together with the screen bottomed container uppermost, and sand initially added to the screen bottomed container so that it may serve as a litter box for a cat, with subsequent lifting of the uppermost screen bottomed container acting to remove solid debris from the sand, leaving the sand then in the uppermost solid-bottomed container of the two nested solid bottomed containers and permitting the screen bottomed container, after cleaning, to be installed into and above the empty lower container of the two nested containers, after removing the lower container from the nested configuration, thus permitting the sand in the remaining container to be poured into the screen bottomed container after it has been thus nested, and permitting the now empty container to be nested under the bottom of the other solid bottomed container.

2. The device described in claim 1, in which each container has handholds along the side adaptable for lifting said container without lifting the containers below the container being thus lifted, with
the handhold of the container having a screen bottom, consisting of an opening in the external inclined side of said container, and
the handholds of each of the two solid bottomed containers consisting of a lateral projecting tab joining the top of the side of each of said containers, said projecting tab extending from approximately the middle of one side of the container and located so as to extend through the opening in the external side of the screen bottomed container when the screen bottomed container is nested above either, or both of the solid bottomed containers.

* * * * *